United States Patent [19]

Yada et al.

[11] Patent Number: 5,035,579
[45] Date of Patent: Jul. 30, 1991

[54] WATER-TURBINE RUNNER AND PROCESS FOR MANUFACTURING THE SAME

[75] Inventors: Masami Yada; Takao Funamoto; Michio Kitamura; Junzo Komatsu; Masakazu Midorikawa; Tsugio Yoshikawa, all of Hitachi, Japan

[73] Assignee: Hitachi, Ltd., Tokyo, Japan

[21] Appl. No.: 436,701

[22] Filed: Nov. 15, 1989

[30] Foreign Application Priority Data

Nov. 22, 1988 [JP] Japan .................. 63-295147

[51] Int. Cl.⁵ .............................................. B63H 1/00
[52] U.S. Cl. .................... 416/241 R; 415/200; 29/889.7
[58] Field of Search ................ 415/228, 200; 416/241 R; 29/889, 889.7

[56] References Cited

U.S. PATENT DOCUMENTS

| | | | |
|---|---|---|---|
| 3,765,793 | 10/1973 | Savonuzzi | 416/213 R |
| 3,902,823 | 9/1975 | Minato et al. | 416/241 R |
| 4,322,200 | 3/1982 | Stiegelmeier | 416/188 |
| 4,609,577 | 9/1986 | Long | 420/56 |
| 4,850,187 | 7/1989 | Siga et al. | 416/241 R |

FOREIGN PATENT DOCUMENTS

| | | | |
|---|---|---|---|
| 60-53737 | of 1985 | Japan. | |
| 1114819 | 9/1984 | U.S.S.R. | 416/186 R |
| 1515296 | 6/1978 | United Kingdom | 416/188 |

*Primary Examiner*—Edward K. Look
*Assistant Examiner*—Hoang Nguyen
*Attorney, Agent, or Firm*—Antonelli, Terry, Stout & Kraus

[57] ABSTRACT

A water turbine runner has a plurality of vanes, each made of a rolled steel plates which contains, by weight, 0.01 to 0.10% of C, 0.10 to 1.0% of Si, 0.10 to 2% of Mn, 2 to 7% of Ni, 10 to 15% of Cr and 0.10 to 4% of Mo, 71.9 to 87.7% of Fe, and which has a metallic structure mixture containing, by volume, martensite and 10 to 35% of residual austenite. Each of the vanes is made of a plurality of plate pieces, cut out from the rolled steel plate, press-formed in a shape of a part of the vane and joined by welding into the complete vane.

14 Claims, 3 Drawing Sheets

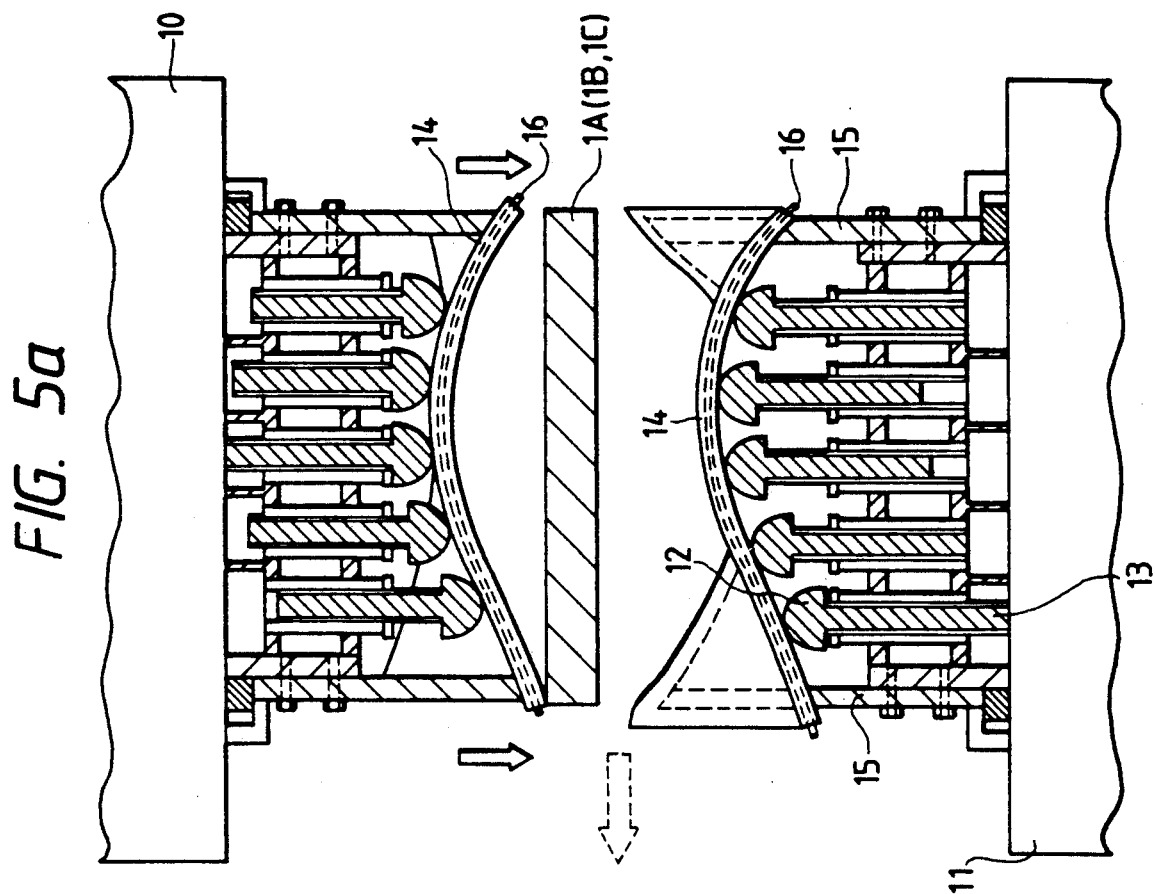

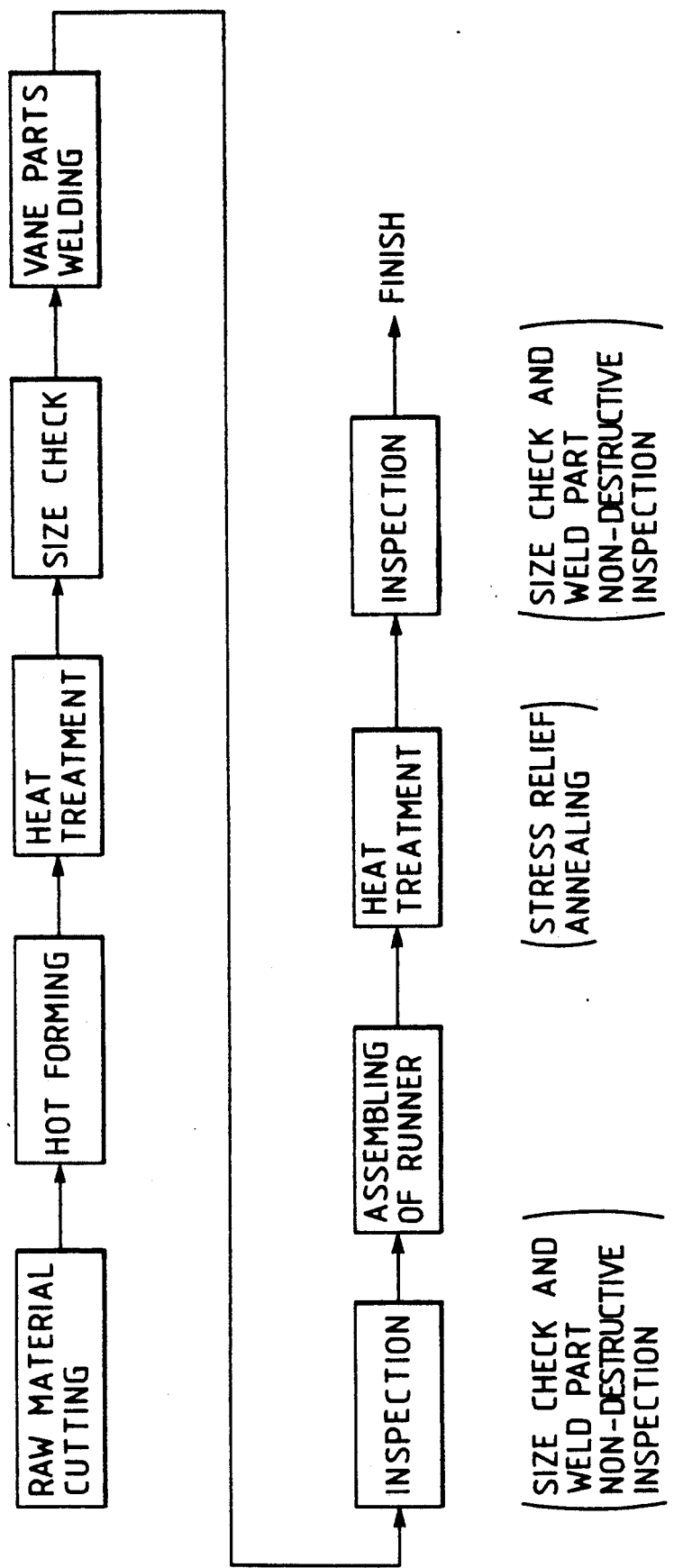

WATER-TURBINE RUNNER AND PROCESS FOR MANUFACTURING THE SAME

BACKGROUND OF THE INVENTION

The present invention relates to a water-turbine runner having a welded structure using a high strength and tough steel plate, and to a process for manufacturing the water-turbine runner.

In order to improve power generating efficiency in recent years, hydro-electric power generation has tended to have a higher and higher lift or head. This tendency requires a water-turbine runner of accordingly higher strength and toughness.

In the prior art, the water-turbine runner has been made of 13Cr steel, i.e., martensite stainless steel which is excellent in cavitation resisting characteristics. This 13Cr steel does not contain Ni. In accordance with the requirement for the output rise and the efficiency improvement of a single water-turbine runner, however, there has been developed 13Cr steel which contains Ni and has an excellent toughness. There has been proposed a water-turbine runner which is one piece cast or plural pieces separately cast of the 13Cr steel as is disclosed in Japanese Patent Publication No. 60-53737.

However, the prior art described above has the following problems:
a) A sufficient toughness cannot be achieved because of defects intrinsic to the casting such as a shrinkage cavity and segregation.
b) For detecting the defects, a non-destructive inspection is used such as the ultrasonic flaw detection or the radiation inspection, but this requires a number or steps for inspecting the whole structure of the three-dimensional water-turbine runner with high precision.
c) The casting defects detected by the non-destructive inspection are remedied by arc welding with covered electrodes, in which the 13Cr steel is liable to incur a weld crack. In order to avoid this weld crack, pre-and post-heating steps are required which undesirably increases the number of steps in the remedial operations.
d) The finishing of the cast surface of the water turbine runner requires a great number of steps.

SUMMARY OF THE INVENTION

An object of the present invention is to provide a highly strong and through water-turbine runner and a process for manufacturing the same a reduced number of steps.

Briefly state, the present invention utilizes a plurality of vanes of a water-turbine runner, each made of a rolled steel plate which contains, by weight, 0.01 to 0.10% of C, 0.10 to 1.0% of Si, 0.10 to 2% of Mn, 2 to 7% of Ni, 10 to 15% of Cr and 0.10 to 3% of Mo, 71.9 to 87.7% of Fe, and which has a metallic structure of a mixture containing, by volume, martensite and 10 to 35% of residual austenite, and the vanes are assembled by welding.

Further, the above-mentioned plurality of vanes, each made of a plurality of plate pieces, are cut out from the abovementioned rolled steel plate in accordance with the present invention, press-formed in a shape of a part of the vane and then joined by welding into the complete vane.

Further rolled steel plate or plate pieces are controlled in accordance with the present invention so that oxygen and nitrogen will be less than 60 ppm and 150 ppm, respectively.

BRIEF DESCRIPTION OF THE DRAWINGS

FIG. 2 is a sectional view of the runner shown in FIG. 1 taken along a plane passing along a central axis of the Francis water-turbine runner in;

FIG. 5a is a sectional view of a die fed with a vane member;

FIG. 5b is a sectional view of the vane member; and

FIG. 6 is a flow chart showing the process of manufacturing the runner in accordance with the present invention.

DETAILED DESCRIPTION OF A PRESENT PREFERRED EMBODIMENT

Figure 1:
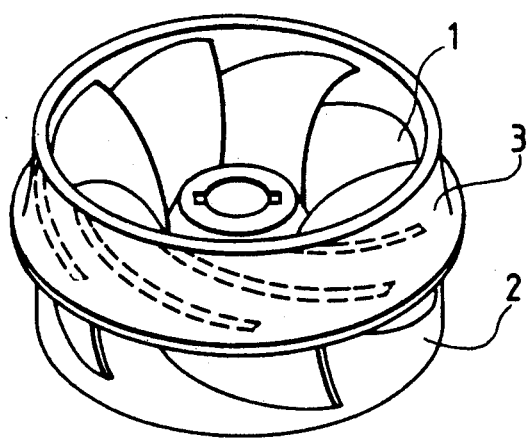
FIG. 1 is a perspective view showing a Francis water-turbine runner to which is applied the present invention.
Figure 2:
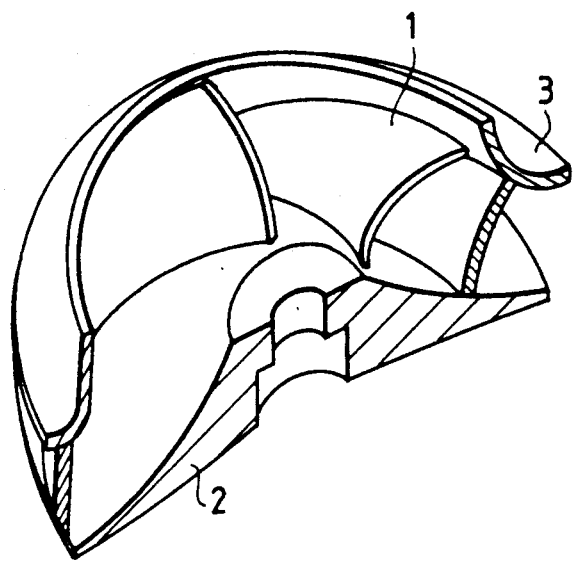

As shown in FIGS. 1 and 2, the Francis water-turbine runner comprises a crown ring 2 having a center portion to be connnected to a drive shaft, a band 3, and a plurality of vanes 1 each interposed between the crown 2 and the band 3 and welded thereto. The vanes 1 each are made of one piece or several pieces or rolled steel plate which will be later described.

The water-turbine runner according to the present invention comprises a plurality of vanes each made of a rolled steel plate which comprises, by weight, 0.01 to 0.10% of C, 0.10 to 1.0% of Si, 0.10 to 2% of Mn, 2 to 7% of Ni, 10 to 15% of Cr and 0.10 to 3% of Mo, and 71.9 to 87.7% of Fe, and oxygen and nitrogen contents being preferably 60 ppm at most and 150 ppm at most, respectively. The runner has a metallic structure of a mixture containing, by volume, martensite and 10 to 35% of residual austenite and is assembled by welding.

The major components Cr and Ni are necessary for imparting strength and cavitation resistance to the water-turbine runner and are contained essentially as in cast steel. In the electron beam welding of a high alloy steel such as the 13Cr steel, however, in order to prevent welding defects and retain the toughness, the contents of oxygen and nitrogen in the steel have to be controlled, and it is essential for the base metal quality to have no cavity.

The reasons for restriction the chemical components in the steel plates are as follows.

The component C when, over 0.10%, will deteriorate the weldability and the notch toughness on the contrary to the increase in the strength. When the component C is below 0.01%, on the other hand, problems in strength and meltability arise.

The component Si has to be more than 0.1% as a deoxidizer in the steel production, but the steel becomes hard and fragile if the Si content exceeds 1%. Thus, Si content is restricted within the range 0.1 to 1.0%.

The component Mn has deoxidizing and desulfurizing actions and contributes as an austenitizing element to the toughness. However, the problem of welding hardness occurs if the Mn content exceeds 2%.

The component Ni is also an austenitizing element and has to be contained within the 2 to 7% range, preferably 4 to 6% so as to retain the amount of the residual austenite. Over 7% of the ocmponent Ni, however, increases the residual austenite so as to reduce strength.

was measured to determine the amount of corrosion of the test surface.

TABLE 1

| Sample | C | Si | Mn | Ni | Cr | Mo | O | N | Remarks |
|---|---|---|---|---|---|---|---|---|---|
| No. 1 | 0.03 | 0.45 | 0.58 | 5.0 | 12.41 | 0.27 | 0.0057 | 0.0126 | Rolled |
| No. 2 | 0.04 | 0.33 | 0.60 | 5.25 | 12.60 | 0.26 | 0.0039 | 0.0089 | ditto |
| No. 3 | 0.04 | 0.31 | 0.62 | 5.12 | 12.50 | 0.26 | 0.0054 | 0.0082 | ditto |
| No. 4 | 0.05 | 0.47 | 0.59 | 5.20 | 12.45 | 0.24 | 0.0046 | 0.0362 | Forged |
| No. 5 | 0.04 | 0.44 | 0.72 | 4.93 | 12.42 | 0.25 | 0.0128 | 0.0476 | Cast |
| No. 6 | 0.07 | 0.45 | 0.51 | 5.05 | 12.73 | 0.21 | 0.0103 | 0.0424 | ditto |

Sample Nos. 1 to 3 are illustrative of the Invention
Sample Nos. 4 to 6 are illustrative of conventional steels The component Cr is fundamental for corrosion resistance and has to be no less than 10% so as to retain the corrosion resistance in plain water. If, however, the Cr content increases, the delta ferrite increases to make the steel fragile so that the upper limit of Cr content is 15%.

The component Mo is an carbide producing element which is remarkably effective in improving the fatigue strength in water and presents annealing brittleness. Over 3%, of Mo content, however, weakens those effects so as to increase hardenability and lower the toughness.

Oxygen reduces the toughness of a metal to be welded and increases the incidence of internal defects such as blow holes, especially in electron beam welding. Consequently, the oxygen content has to have an upper limit of 60 ppm.

The nitrogen component is bonded, if in trace amounts, to the aluminum in the steel to act as fine cores of crystal particles. However, when present in excess, the nitrogen not only segregates in the austenite particles but also causes blow holes like the oxygen component so that its content has to have an upper limit of 150 ppm.

The steel structure of the present invention is mainly in the mixed state of martensite and residual austenite. The amount of this residual austenite may be more than 10% from the standpont of toughness and less than 35% from the standpoint of strength.

Moreover, the forementioned steel is rolled and cut into predetermined sizes after non-destructive inspection and visual inspection so that it may be used for components of the water-turbine runner. These inspections of the steel plate not only are highly efficient but also can improve the accuracy. As a matter of fact, these inspections cover about eighty to ninety percent of the total inspections of the water runner.

Then, the steel plate is subjected to plastic working with a mold having a three-dimensinal curve and is assembled by being welded with an electron beam.

The material of the vanes 1 will be described hereunder.

Table 1 enumerates the chemical components of the sample steels of the aforementioned water-turbine runner, and Table 2 enumerates the mechanical properties of the sample steels. In Table 2, there are also enumerated the results of both the cavitation erosion (Ce) tests and the destructive toughness tests.

In the cavitation erosion tests, a magnetic strain oscillation type tester was used. The test conditions were as follows: the frequency was 6.5 kHz; the amplitude was 120 m; the test liquid was service-water; the test liquid temperature was 25° C.; and the test time was 2 hours. The difference between the weights of the test surface having a diameter of 22 mm before and after the tests

TABLE 2

| | Sample No. | | | | | |
|---|---|---|---|---|---|---|
| | 1 | 2 | 3 | 4 | 5 | 6 |
| Tensile Strength (kgf/mm$^2$) | 85.0 | 84.6 | 87.0 | 86 | 84 | 85 |
| 0.2% Yield Point (kgf/mm$^2$) | 70.5 | 71.0 | 64.0 | 69 | 64 | 64 |
| Elongation (%) | 26 | 26 | 24 | 25 | 19 | 20 |
| Reduction (%) | 71 | 70 | 69 | 70 | 61 | 63 |
| Residual Austenite (%) | 32 | 30 | 31 | 29 | 30 | 31 |
| CE Test Corrosiveness (mg) | 50 | 47 | 53 | 59 | 60 | 68 |
| 2 mm V-Notch Charpy Impact Value (kgf-m) at 0° C. | 14 | 16 | 19 | 13 | 6 | 8 |
| Fracture Toughness (kgf · mm$^{-3/2}$) at 0° C. | 620 | 600 | 605 | 580 | 390 | 350 |

Sample Nos. 1 to 3 are illustrative of the Invention
Sample Nos. 4 to 6 are illustrative of conventional steels In the fracture toughness tests, the fracture toughness at 0° C. was determined by the elastic/plastic fracture toughness testing method using a compact tension test piece having a thickness of 12.7 mm in conformity to the ASTM E813-81.

Next, the test results will be described The Samples Nos. 1 to 3 belong to the rolled steels of the present invention. The Samples Nos. 4 to 6 belong to the steels for comparison, and of these, Samples Nos. 5 and 6 are cast steels similar to those of the water-turbine runner of the prior art, and Sample No. 41 is forged steel. These steels are composed mainly of 5Ni-13Cr but have different contents of oxygen and nitrogen gases.

For tensile strength and the 0.2% yield point, no substantial difference is found between the cast steel and the rolled steel. However, the rolled steel is found to have larger values of elongation and reduction than those of the cast steel and, accordingly, to be slightly more ductile.

As to the characteristics required for preventing the structures from being broken, such as the impact value or the fracture toughness, moreover, the rolled steel is seen in Table 2 to be far superior to the cast steel. This superiority is influenced by the difference in the amounts of non-metallic inclusions contained in the steels and is caused by the fact that the rolled steel has a lower cleanness (Total) of 0.033 to 0.053 than that of the cast steel of 0.11 to 0.14.

Next, the results of the examination of the electron beam weldability of the 5Ni-13Cr steel will be described.

The electron beam welding method is being applied more frequently to large-sized thick structures of carbon steel in accordance with the development of a high-power apparatus, because this method produces less welding deformation and thus can weld a thick plate in one path.

What has to be considered, we have found, especially for practising the electron beam welding in a high strength water-turbine runner, is the presence of welding defects such as porosity or hot cracking and the various characteristics such as the mechanical properties of the welded portions and the rupture toughness.

Figure 3:
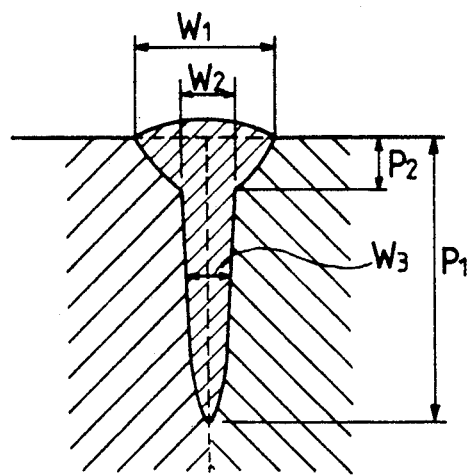
FIG. 3 is a diagram showing a bead shape taken along III—III of FIG. 4.

The examined results of the weldability of the 5Ni-13Cr steel are enumerated below in Table 3, wherein the bead shape reference characters, $W_1$, $W_2$, $W_3$, $P_1$ and $P_2$ are shown in FIG. 3. The samples were worked to have a plate thickness of 80 mm and were welded at their I-shaped abutting portions with an acceleration voltage of 90 kV, a beam current of 300 to 350 mA, a beam oscillation of a diameter of 0.5 mm ×500 Hz, and the focal point 80 mm below the surface of the materials to be welded.

TABLE 3

|  | Sample No. | | | | | |
|---|---|---|---|---|---|---|
|  | 1 | 2 | 3 | 4 | 5 | 6 |
| Thickness (mm) | 80 | 80 | 80 | 80 | 80 | 80 |
| Gas Content (ppm) | | | | | | |
| O | 57 | 39 | 54 | 46 | 128 | 103 |
| N | 126 | 82 | 82 | 362 | 476 | 424 |
| EB Welding Condition | | | | | | |
| Acceleration Voltage (kv) | 90 | 90 | 90 | 90 | 90 | 90 |
| Beam Current (mA) | 310 | 310 | 310 | 300 | 330 | 350 |
| Focus Position (mm) | −80 | −80 | −80 | −80 | −80 | −80 |
| Welding Speed (mm/min) | 150 | 150 | 150 | 150 | 150 | 150 |
| Beam Oscillations | | | 0.5 φ × 500 Hz | | | |
| Bead Shape (mm) | | | | | | |
| $W_1$ | 16.9 | 17.1 | 17.1 | 16.5 | 19.0 | 20.5 |
| $W_2$ | 6.7 | 6.8 | 6.8 | 6.5 | 7.0 | 7.5 |
| $W_3$ | 5.1 | 5.1 | 5.1 | 5.0 | 5.2 | 5.5 |
| $P_1$ | 71 | 71 | 71 | 70 | 72 | 75 |
| $P_2$ | 6.6 | 6.6 | 6.6 | 6.5 | 7.2 | 7.4 |
| Inspection of Welded Portion | | | | | | |
| UT (Defect) | NO | NO | NO | YES | YES | YES |
| Section (Defect) | NO | NO | NO | YES | YES | YES |

Sample Nos. 1 to 3 are illustrative of the Invention
Sample Nos. 4 to 6 are illustrative of conventional steels Although none of the samples were hot-cracked, Samples Nos. 4 to 6 were found to have porosity in the vicinity of the center of the welded metal. Our various investigations have revealed that the porosity was caused by the influences of the oxygen and nitrogen gases contained in the steel. As seen from the Table 1, Samples Nos. 4 to 6 had an oxygen content of about 50 to 130 ppm and a nitrogen content of about 360 to 480 ppm.

In view of these findings, the relations between the occurrence of the porosity and the oxygen and nitrogen in the 5Ni-13Cr steel were examined, and we found that neither hot cracks nor porosity was caused with the oxygen content set at 60 ppm and the nitrogen content set at 150 ppm.

Such steels are also confirmed to exhibit excellent characteristics in the fracture toughness of not only the base metal when the oxygen and nitrogen contents are set at 60 ppm and 150 ppm, respectively but also welded metal.

The compared results of the fracture toughness and the cavitation corrosion of the electron beam welded metal are enumerated between the steels of the present invention (Sample No. 1) and the conventional steels (Sample No. 5) used, for comparison in Table 4 below.

TABLE 4

| Sample | Welding | Fracture Toughness (kg · mm$^{-3/2}$) | Cavitation Corrosion (mg) |
|---|---|---|---|
| No. 1 (Inv.) | Electron Beam | 625 | 55 |
| No. 5 (Comp.) | Electron Beam | 410 | 60 |

The two steels are not substantially different in cavitation characteristics, but the present steel of the invention is higher by 30% in fracture toughness than the comparison steel. It is evident that this difference is influenced by the cleanness and oxygen content of the base metal.

The results of the steel of the present invention (Sample No. 1) upon the tensile tests of the electron beam welded joints are enumerated in comparison to the conventional steels (Sample No. 5) in Table 5.

TABLE 5

| Sample | Welding | Tensile Strength (kgf/mm$^2$) | Yield Point (kgf/mm$^2$) | Elongation (%) | Fracture Position |
|---|---|---|---|---|---|
| No. 1 (Inv.) | Electron Beam | 84.8 | 75.0 | 24.6 | Base Metal |
| No. 5 (Comp.) | SMAW | 64.3 | 47.9 | 60 | Welded Metal |

From Table 5, it is apparent that the electron beam welded metal is not softened but has a strength identical to that of the base metal. Incidentally, the strength in case the sealed metal arc weld (SMAW) was used is enumerated in Table 5 but takes a far lower strength than the electron beam welding in the case of the austenite welding rod.

The most practical rolled steel has a content consisting essentially of by weight, 0.02 to 0.05% C, 0.2 to 0.5% Si, 0.5 to 1.0% Mn, 4.5 to 5.8% Ni, 12 to 14% Cr, 0.2 to 20% Mo and the balance of Fe, wherein P, S, O and N as unavoidable contents are less than 0.03%, less than 0.015%, less than 60 ppm, less than 150 ppm, respectively.

Thus, it has been found that the rolled steel used in the present invention has superior electron beam weldability and notch toughness of the joint to the cast metal. On the basis of these results, a half-size water-turbine runner was trial manufactured.

Next, manufacture of the water-turbine runner will be described.

The vanes 1 each are sized to have a length of 8,000 mm, a maximum width of 1,700 mm, and a thickness of 80 mm.

Figure 4:
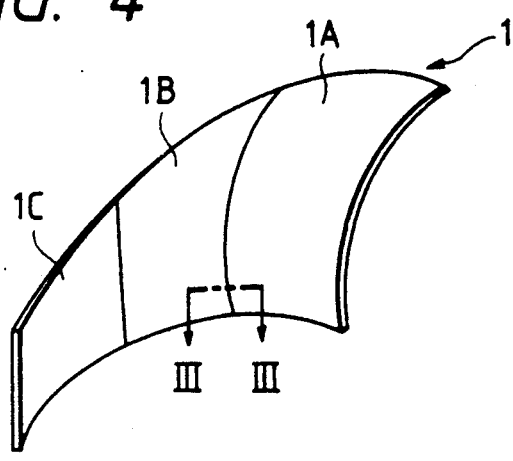
FIG. 4 is a perspective view showing a assembled runner vane.

Each of the vanes 1, as shown in FIG. 4, comprises three vane pieces 1A, 1B, 1C, each of which is cut off piece from a rolled plate in such a manner that the rolling direction of the rolled plate coincides with a longitudinal direction of the vane 1, and is press-formed by hot-and cold working by using a multispindle plastic working press.

The press has a structure, as shown in FIG. 5a, in which movable rods 13 carrying semispherical movable heads 12 are attached to upper and lower tables 10 and 11 arranged vertically to face each other. To the leading ends of the movable heads 12, there are fixed a pair of pressing plates 14 which have three-dimensional curves and are supported at their two side ends by supporting side plates 15. In each of the pressing plates 14, moreover, there are disposed water conduits 16 for cooling the pressing plates 14. The movable rods 13 are held by hydraulic means at positions where the heads 12 are in contact with the pressing plates 14, and the movable rods 13 associated with the upper table 10 are moved downwardly by the upper table 10 as shown by the arrow.

When the cut-off plate pieces 1A, 1B and 1C are disposed on the lower pressing plate 14 and pressed by the pressing plate moving downwards with the table 10 to follow the three-dimensional curves, they are heated in advance to about 950° C. and then pressed between the upper and lower pressing plates 14. The pressure upon the cut off plate pieces 1A, 1B and 1C is continued until the martensite transformation is ended to prevent the vane pieces 1A, 1B and 1C from buckling and from being deformed by the thermal expansion of the martensite transformation, which might otherwise be caused if the pressure were released before the end of the martensite transformation.

The vane pieces 1A, 1B, and 1C thus formed by the press as shown in FIG. 5b, are welded and integrated into a one piece vane 1 by a three-dimensional electron beam welder, and the integrated structure is then subjected to the sizing inspection and the non-destructive inspection.

The thus manufactured vanes 1 are arranged on the crown ring 2 and the band 3 shown in FIGS. 1 and 2 and welded thereto, whereby the water-turbine runner is fully produced.

The procedures for manufacturing the water-turbine runner described above are shown in the flow chart of FIG. 6.

According to FIG. 6 raw material in the form of a rolled steel plate is cut to produce a plurality of plates pieces 1A, 1B, 1C. The plate pieces are formed by hot-working, the formed plate pieces of vane pieces 1A, 1B, 1C, are heated to a temperature of 590°±20° C. and then cooled, thereby annealing the pieces so that 100% martensite is converted to be a mixture of martensite and 10 to 35% by volume of residual austenite. The annealed vane pieces are then subjected to size check, and welded to a integrate the pieces into one complete vane form by electron beam welding. The formed vane is subjected to size check and non-destructive inspection of the weld portion. The vane 1 is assembled into the runner by welding, the assembled runner is subjected to heat treatment to relieve strain and control the residual austenite amount to a predetermined amount. The heat treated runner is checked in size and inspected of the welded portion in a non-destructive manner, whereby the runner is completed.

The present invention can be applied to the manufacture of not only the vane 1 but also the band 2, that is, the band 2 also can be made of the above-mentioned rolled steel plate press formed in the band shape. The crown ring preferably is cast of a steel having the same content as mentioned rolled steel plate except for nitrogen and oxygen.

As has been described hereinbefore, according to the present invention, it is possible to provide a highly strong, tough and corrosion-resisting water-turbine runner so that fracture safety reliabilty can be improved.

The present invention has high economical merit because the number of manufacturing steps can be reduced.

What is Claimed is:

1. A water-turbine runner comprising a rotary member with a central portion for connecting a drive shaft, and a plurality of vanes each provided on said rotary member, each of said vanes is made of a rolled steel plate comprising, by weight, 0.01 to 0.10% of C, 0.10 to 1.0% of Si, 0.10 to 2% of Mn, 4 to 6% of Ni, 10 to 15% of Cr and 0.10 to 3% of Mo, and 71.9 to 87.7% of Fe, and has a metallic mixture containing, by volume, martensite and 10 to 35% of residual austenite, and wherein weld means are provided for mounting said vanes on said rotary member.

2. The water turbine runner according to claim 1, wherein each of said vanes comprises a plurality of vane pieces made of the rolled steel plate, and wherein weld means are provided for integrating said vane pieces into the respective vanes.

3. The water-turbine runner according to claim 1, wherein oxygen and nitrogen contained in said rolled steel plate are 60 ppm maximum and 150 ppm maximum, respectively.

4. The water-turbine runner according to claim 3, wherein said weld means for mounting said vanes on said rotary member are effected by electron beam welding, and wherein welded portions of said rotary member contain 10 to 35% by volume of residual austenite.

5. The water-turbine runner according to claim 4, wherein the welded portions are heat treated.

6. A water-turbine runner comprising a crown ring and a plurality of vanes each mounted on said crown ring, each of said vanes comprising a plurality of plate pieces cut off from a rolled steel plate consisting essentially of, by weight, 0.01 to 0.10% C, 0.10 to 1.0% of Si, 0.10 to 2% of Mn, 4 to 6% of Ni, 10 to 15% of Cr and 0.10 to 3% of Mo, and the balance of Fe, and which has a metallic mixture containing, by volume, martensite and 10 to 35% of residual austenite, wherein each of said plate pieces has a shape of a portion of the respective vanes, and weld means are provided for integrating said plate pieces into the respective vanes.

7. The water-turbine runner according to claim 6, wherein a maximum oxygen content and maximum nitrogen content in said rolled steel plate are 60 ppm and 150 ppm, respectively.

8. The water-turbine runner according to claim 7, wherein welded portions contain 10 to 35% by volume of residual austenite.

9. The water-turbine runner according to claim 6, wherein said plate is melted to have a conrolled maximum oxygen content of 60 ppm and a controlled maximum nitrogen content of 150 ppm.

10. The water-turbine runner according to claim 6, wherein welded portions join the plate pieces to form said vanes.

11. The water-turbine runner according to claim 8, wherein the welded portions comprise heat treated electron beam welds.

12. A water-turbine runner comprising:
a crown ring with a shaft receiving portion at a central portion thereof, a band and a plurality of vanes interposed between said crown ring and said band, wherein each of said plurality of vanes comprise plate pieces consisting essentially of, by weight, 0.02 to 0.05% of C, 0.2 to 0.5% of Si, 0.5 to 1% of Mn, 4.5 to 5.8% of Ni, 12 to 14% of Cr and 0.2 to 2% of Mo, and the balance of Fe, a maximum oxygen and a maximum nitrogen contained in said rolled steel plate being 60 ppm and 150 ppm, respectively, and which has a metallic mixture containing, by volume, martensite and 10 to 35% of residual austenite.

13. A process for manufacturing a water-turbine runner, comprising the steps of:
forming into a three-dimensional shape a rolled steel plate which contains, by weight, 0.01 to 0.10% of C, 0.10 to 1.0% of Si, 0.10 to 2% of Mn, 4 to 6% of Ni, 10 to 15% of Cr and 0.10 to 3% of Mo, 71.9 to 87.7% of Fe, the oxygen content being no greater than 60 ppm, and the nitrogen being no greater than 150 ppm, and which has a metallic structure mixture containing martensite and residual austenite and which is regulated such that the residual austenite is 10 to 35% by volume;

electron beam welding the formed steel plate; and subjecting the steel plate to a heat treatment so that welded portions contain 10 to 35% of residual austenite by volume.

14. A water-turbine runner manufacturing process as set forth in claim 13, wherein the step of forming said rolled steel plate into the three-dimensional shape includes the steps of: heating said rolled steel plate; and subsequently holding the heated steel plate under pressure from a forming starting temperature to an Ms critical temperature.

* * * * *